United States Patent
Bonarens et al.

(10) Patent No.: US 10,457,277 B2
(45) Date of Patent: Oct. 29, 2019

(54) DRIVER ASSISTANCE SYSTEM

(71) Applicant: GM GLOBAL TECHNOLOGY OPERATIONS LLC, Detroit, MI (US)

(72) Inventors: Frank Bonarens, Ruesselsheim (DE); Gerald Schmidt, Ruesselsheim (DE); Heiko Bald, Ruesselsheim (DE)

(73) Assignee: OPEL AUTOMOBILE GMBH, Russelheim (DE)

( * ) Notice: Subject to any disclaimer, the term of this patent is extended or adjusted under 35 U.S.C. 154(b) by 84 days.

(21) Appl. No.: 15/594,286

(22) Filed: May 12, 2017

(65) Prior Publication Data
US 2017/0327111 A1 Nov. 16, 2017

(30) Foreign Application Priority Data
May 12, 2016 (DE) .......................... 10 2016 005 884

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 10/20* (2013.01); *B60W 30/08* (2013.01); *B60W 30/095* (2013.01); *B60W 30/0956* (2013.01); *B60W 40/08* (2013.01); *B60W 50/0097* (2013.01); *B60W 50/08* (2013.01); *B60W 50/082* (2013.01);
(Continued)

(58) Field of Classification Search
CPC ...... B60W 30/09; B60W 50/08; B60W 30/08; B60W 40/08; B60W 50/14; B60W 30/0956; B60W 10/20; B60W 50/0097; B60W 50/082; B60W 10/18; B60W 2540/00; B60W 2050/143; B60W 2510/18; B60W 2510/20; B60W 2540/04; B60W 2710/18; B60W 2710/20; B60W 2420/52; B60W 2420/42; B60W 30/095; B60W 50/10; B60W 50/12; G05D 1/0061; G05D 1/0088
USPC ............................................. 701/45, 300–302
See application file for complete search history.

(56) References Cited

U.S. PATENT DOCUMENTS 8,527,172 B2 9/2013 Moschuk et al.
2004/0122578 A1* 6/2004 Isaji .......................... B60T 7/12
701/70
(Continued)

FOREIGN PATENT DOCUMENTS

DE 10132386 A1 1/2003
DE 102012112802 A1 6/2014

OTHER PUBLICATIONS

German Patent Office, German Search Report for German Patent Application No. 10 2016 005 884.6 dated Dec. 19, 2016.

*Primary Examiner* — Nga X Nguyen
(74) *Attorney, Agent, or Firm* — Sandberg Phoenix & von Gontard, P.C.

(57) ABSTRACT

A driver assistance system for avoiding collisions includes an environmental sensor for detecting the traffic environment of the vehicle and a processing unit configured to assess the traffic environment as to the likelihood of a danger and plan a route avoiding or at least minimizing the danger for the vehicle. The processing unit is further configured to predict a possible control intervention of the driver in reaction to the danger and select a route which is compatible with that control intervention.

13 Claims, 2 Drawing Sheets

(51) Int. Cl.
*B60W 10/20* (2006.01)
*B60W 30/095* (2012.01)
*B60W 40/08* (2012.01)
*B60W 50/00* (2006.01)
*B60W 50/08* (2012.01)
*B60W 50/14* (2012.01)
*G05D 1/00* (2006.01)
*B60W 30/08* (2012.01)
*B60W 50/10* (2012.01)
*B60W 50/12* (2012.01)

(52) U.S. Cl.
CPC ............ *B60W 50/10* (2013.01); *B60W 50/12* (2013.01); *B60W 50/14* (2013.01); *G05D 1/0061* (2013.01); *G05D 1/0088* (2013.01); *B60W 2050/143* (2013.01); *B60W 2420/42* (2013.01); *B60W 2420/52* (2013.01); *B60W 2510/18* (2013.01); *B60W 2510/20* (2013.01); *B60W 2540/00* (2013.01); *B60W 2540/04* (2013.01); *B60W 2710/18* (2013.01); *B60W 2710/20* (2013.01)

(56) References Cited

U.S. PATENT DOCUMENTS

| | | | |
|---|---|---|---|
| 2014/0379247 | A1* | 12/2014 | Ferguson .............. B60W 30/09 701/301 |
| 2015/0224988 | A1* | 8/2015 | Buerkle ................ B60W 50/14 701/45 |
| 2015/0232090 | A1 | 8/2015 | Jeon et al. |
| 2015/0291216 | A1 | 10/2015 | Sato |
| 2016/0091083 | A1 | 3/2016 | Drees et al. |
| 2016/0107644 | A1 | 4/2016 | Eigel |
| 2017/0285646 | A1* | 10/2017 | Connor ............... B60W 30/025 |
| 2017/0327110 | A1* | 11/2017 | Inoue ................... B60W 10/18 |

* cited by examiner

DRIVER ASSISTANCE SYSTEM

CROSS-REFERENCE TO RELATED APPLICATION

This application claims priority to German Patent Application No. 102016005884.6, filed May 12, 2016, which is incorporated herein by reference in its entirety.

TECHNICAL FIELD

The present disclosure pertains to a driver assistance system for avoiding collisions.

BACKGROUND

DE 10 2011 054 344 A1 discloses a driver assistance system, which provides a combined braking and directional control maneuver in order to avoid collisions.

It may well be the case that in a dangerous situation such a driver assistance system is able find a suitable evasion route more quickly and more safely than a human driver. During fully automated driving, taking that route may be the best option even if it involves sharper braking and directional changes than a driver would otherwise be ready or able to execute. During manual driving, however, it may be problematic if, in a critical situation, the driver assistance system takes control of the vehicle and performs a maneuver which the driver had not intended. A partial taking of control in which the driver and the driver assistance system simultaneously influence the direction and/or speed of the vehicle thus potentially hindering one another is even less expedient.

SUMMARY

The present disclosure provides a driver assistance system which can deliver effective and appropriate support during both manual and automated driving. In an embodiment of the present disclosure, a driver assistance system includes an environmental sensor for detecting the traffic environment of a vehicle and a processing unit configured to assess the traffic environment for the existence of a hazard and plan a route in order to avoid or at least minimize the danger to the vehicle. The processing unit is further configured to predict a driver's potential steering intervention reaction to the danger, and select a route which is compatible with that steering intervention.

In a confusing traffic situation, a human driver tends a priori to brake, even if it is physically possible to drive around an obstacle located in front of the vehicle. Thus, a route that may be considered compatible with the driver's control intervention is primarily a route which remains drivable if the driver brakes without a bypassing or an overtaking, which is bound to fail if the braking intervention of the driver makes the vehicle fitted with the driver assistance system slower than the vehicle ahead, or if the overtaking maneuver is so prolonged by the braking intervention that a danger from oncoming traffic may be presented.

During automated driving the driver assistance system has full control over the steering and if this is maintained even when a hazard is identified, it may steer a route which is suitable for avoiding the danger even if it is a route that the driver probably would not have been prepared to drive. Since it is not necessary to take account of a potential control intervention by the driver in this situation, it is also not necessary to predict that control intervention, and the driver assistance system can direct the vehicle to take the objectively most suitable route for avoiding or minimizing the hazard, without having to take into account whether this route is compatible with a potential control intervention of the driver.

Of course a driver may also be trusted to react to a danger by avoiding it, albeit the more so, the smaller the avoiding maneuver is. When a swerve greater than the width of a vehicle is necessary, it is likely that the driver will not consider this possibility and will resist any attempt by the driver assistance system to perform such a maneuver. Thus, the control interventions predicted by the inventive driver assistance system may also include a swerve, although preferably only a maximum swerve of a vehicle's width.

The processing unit may be connected with and configured to assess the responsiveness of the driver, in order to take into account the responsiveness of the driver when predicting the driver's reaction. Assessing the responsiveness of the driver may in particular include a sensor which responds to a movement of the control instrument, for example a steering wheel or a brake. If the driver does not have a hand on the steering wheel, there is no question of making a directional control maneuver in the time he would need to take hold of the steering wheel. In the same way, a braking action in the time it would take to move a foot from the accelerator pedal to the brake pedal may be ruled out of any prediction of whether the driver is likely to brake.

The processing unit may be configured to address a user interface, in order to suggest to the driver the predicted control intervention. If this happens before the driver himself has decided on a control intervention, the time which elapses before the control intervention may be shortened. The time window available for performing the avoidance maneuver is thus accordingly longer and the avoidance maneuver is easier and safer.

If the user interface includes an actuator for influencing a control instrument, it may address this actuator in order to direct the driver's attention to the relevant control instrument, in case it is needed for the predicted control intervention.

The effect of the actuator should be clearly detectable by the driver who is touching the control instrument, but should not itself be a control intervention, and in particular should not adjust the control instrument, so that the driver retains unrestricted control over the vehicle. Such an effect may in particular consist in the actuator causing the control instrument to vibrate. This does not of course preclude the possibility that the processing unit may use the same actuator to adjust the control instrument.

In order to signal to the driver not only that the control instrument needs to be operated, but also—in particular in the case of the steering wheel—to advise a direction of operation, the vibrations may be initiated asymmetrically, in that the actuator exerts in one or more short bursts respectively a torque on the steering wheel in direction of the predicted control intervention, and leaves it to the driver to exert an counter torque if he does not wish to carry out the predicted steering intervention.

The present disclosure also concerns a method for avoiding collisions. The traffic environment of a vehicle is detected and the traffic environment for the existence of a danger is assessed. A potential control intervention by the driver in reaction to the danger is predicted. A route is planned for the car which will prevent or at least minimize the hazard and be compatible with the predicted control intervention by the driver.

Further subjects of the present disclosure are a computer program product with program code which enable a computer to function as a processing unit in a driver assistance system as described above, or to carry out the method defined above, as well as a computer readable data carrier, in which programming instructions have been recorded which enable a computer to function in the manner described above.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
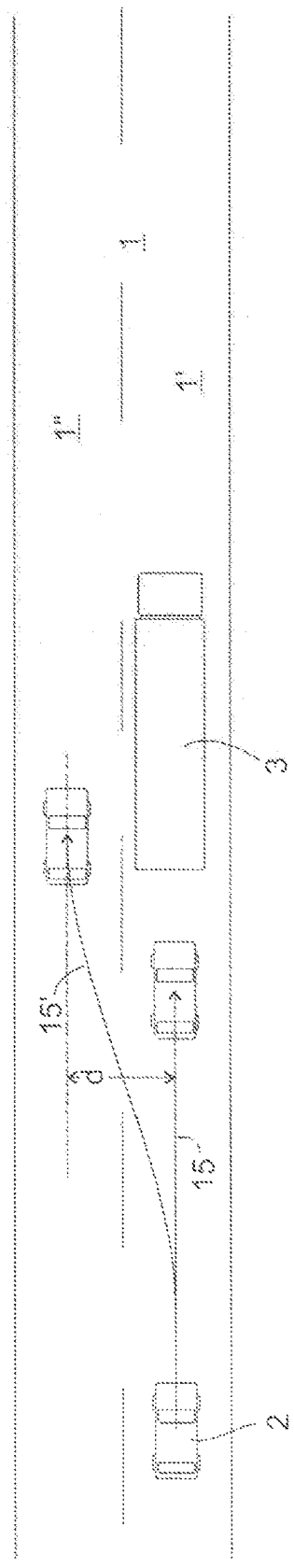
FIG. 1 shows a traffic situation in which a driver assistance system in accordance with the present disclosure may be used.

FIG. 1 shows an ego-vehicle 2 on a road 1, which is fitted with a driver assistance system 2' according to the present disclosure and a third-party vehicle 3, which are underway on the same traffic lane 1' of the road 1. The ego-vehicle 2 is approaching the third-party vehicle 3 from behind. The aim of the driver assistance system 2' is to avoid a collision with the third-party vehicle 3.

Figure 2:
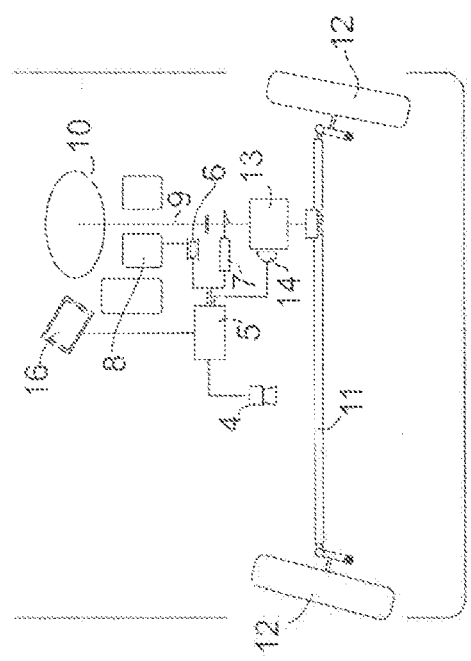
FIG. 2 shows a block diagram of the driver assistance system.

To this end, the driver assistance system 2', as may be seen from the block diagram in FIG. 2, includes an environmental sensor 4, for example a camera, a radar sensor or an arrangement of cameras or radar sensors, which monitors the environment around the ego-vehicle 2. The driver assistance system 2' also includes a processing unit 5, typically a microcomputer configured to use the data from the environmental sensor 4 to identify objects in the vicinity of the ego-vehicle 2, such as the third-party vehicle 3, to determine their distance from the ego-vehicle 2 as well as the rate of change of that distance, and to assess an object as being a danger if the time it would take until a collision, calculated on the basis of the actual distance of the object and the rate of change of that distance (hereinafter also referred to as time to collision or TC) falls below a given threshold. In the event that an object is assessed to be a danger, the processing unit 5 is configured to find a route 15, 15' for the ego-vehicle 2 on which a collision with the object is avoided. In the situation shown in FIG. 1, this route may include continuing to drive in lane 1' whilst simultaneously braking, or in changing over into lane 1".

The processing unit 5 is connected to actuators 6, 7, which are configured to intervene in the directional or speed control of the ego-vehicle 2. The actuator 6 is arranged on a brake pedal 8, in order to move it under the control of the processing unit 5. The actuator 7 is configured to exert a torque on a steering spindle 9, which couples a steering wheel 10 to a steering track rod 11 and the front wheels 12 of the ego-vehicle 2.

In order to assess the readiness of the driver to interfere in the control of the vehicle, a touch sensitive sensor for detecting a driver's hand on the steering wheel 10 may be provided. It is however also possible to monitor the torque exerted on the steering spindle 9 by the intervention of the driver at the steering wheel 10, or to monitor the effort made by the power steering 13 by a sensor 14, in order, if appropriate, to conclude that the driver has his hands on the steering wheel 10 and, if appropriate, is able to quickly activate the steering wheel 10.

Furthermore, the processing unit 5 is connected to a display instrument 16 which is arranged within the driver's field of vision.

The driver assistance system 2' supports manual as well as automated driving. If the third-party vehicle 3 is moving at a constant speed, in automatic driving mode the vehicles 2, 3 do not come close enough to one another for vehicle 3 to be assessed as a danger because the processing unit 5 either slows down the ego-vehicle 2 or carries out an overtaking maneuver. During manual driving, a critical convergence with vehicle 3 may occur if the driver allows too strong an approach out of carelessness. In both modes, the third-party vehicle 3 may become a hazard if it slows abruptly and thereby reduces the distance to the ego-vehicle 2.

Figure 3:
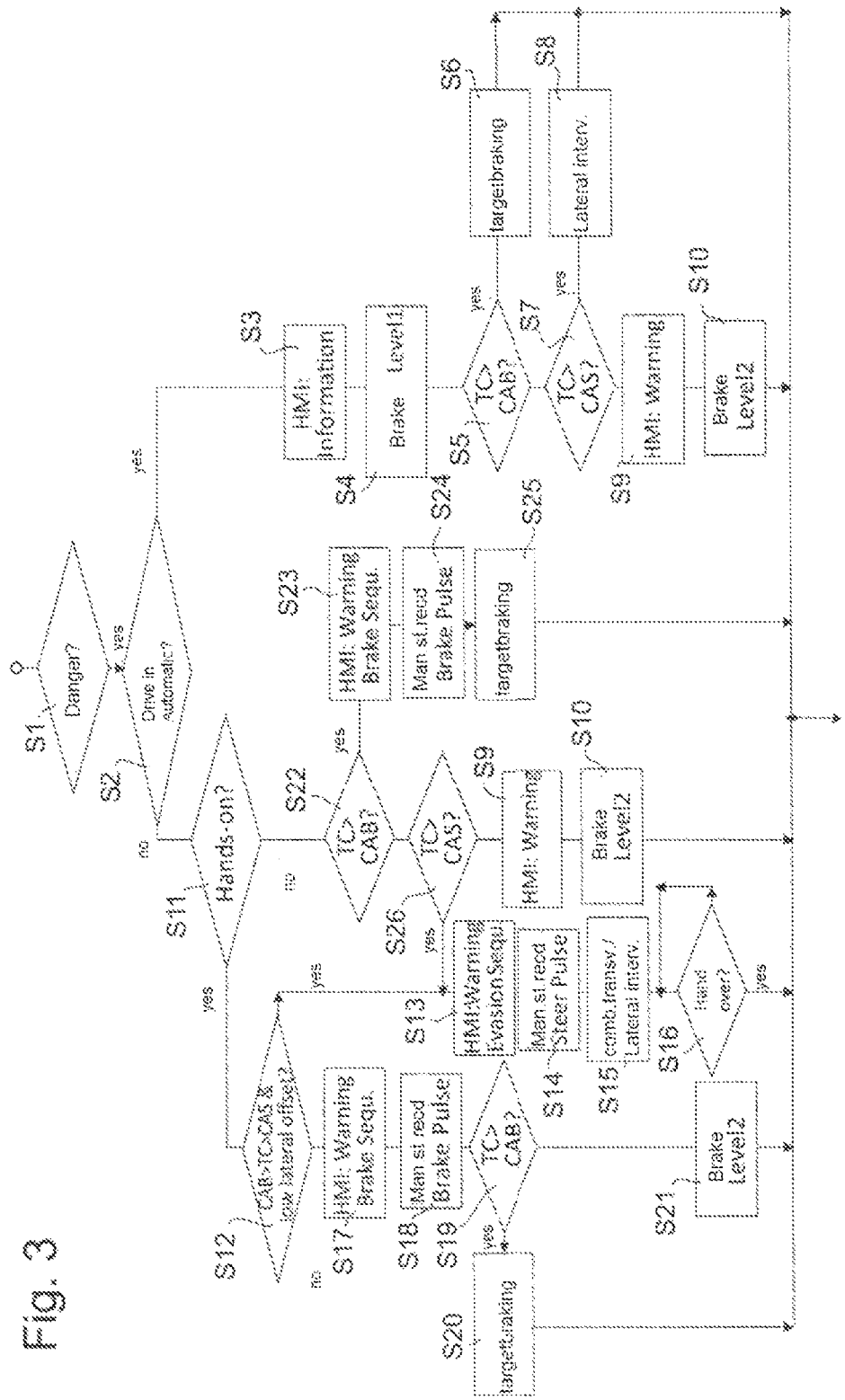
FIG. 3 shows a flow diagram of a working method of the driver assistance system.

FIG. 3 shows a working method for dealing with such a situation. The process begins at S1 in which the third-party vehicle 3 is identified as a danger, because the time to collision (TC) has dropped below a given threshold. If this is the case, S2 involves checking whether the processing unit 5 is in manual or automated mode.

In the automated mode of operation, it must be assumed that the driver is not able to take over control of the vehicle and adequately control it in the remaining time available before the threatened collision. Thus, at S3 information is displayed to the driver on the display instrument 16 which indicates an imminent control intervention by the processing unit 5 and by which the driver, if he is alarmed by the abrupt movement of the vehicle 2 resulting from the control intervention, can make certain that the driver assistance system 2' is functioning correctly. At S4, the processing unit 5 simultaneously activates the actuator 6 in order to slow the vehicle 2 down.

At S5, a new estimate of the TC is made taking into consideration the slowing of the vehicle 2 and comparing it with a lower braking intervention limit (CAB). If the TC is above the lower limit CAB and therefore long enough for such a braking intervention, the ego-vehicle 2 is slowed down at S6 to the speed of the vehicle 3 in front in accordance with route 15 shown in FIG. 1, and the process returns to the beginning.

If the TC is too short for the ego-vehicle 2 to be slowed down to the speed of vehicle 3 before colliding with it, a decision is made at S7 as to whether a swerve into the neighboring lane 1" of the road 1 may be considered. The requisite assessment for this purpose of whether there is enough room to swerve into lane 1", i.e. whether the required stretch of lane 1" is free of oncoming and overtaking vehicles, should conveniently already have been made before the identification at S1 of the danger, so that at S7 the results of this assessment can be recalled without having to spend significant computing power. If there is space in lane 1", S7 can be limited to the assessment of whether the TC is still longer than the time needed for switching lanes (CAS). If 'yes', the processing unit 5 intervenes with a supporting or processor intervention via the actuator 7 in the directional control of the ego-vehicle 2 in order to steer it into a swerve into lane 1" according to route 15'.

If there is no longer enough time TC for this, or there is insufficient room to swerve into lane 1", then at S9 a warning is initiated on the display unit 16 and an emergency stop follows at S10, in order to make the collision, which has been recognized as unavoidable, as mild as possible.

If it is established at S2 that the driver assistance system 2' is in manual mode, a short term control intervention by the driver cannot be precluded. In order to ensure the decision-making autonomy of the driver, the driver assistance system 2' should, as far as possible, not hinder this control intervention. On the other hand, however, it should be able to protect the vehicle and its occupants in the absence of any control intervention by the driver. To this end, at S11, the preparedness of the driver to make the control intervention is assessed first. If the assessment shows that the driver has his hands on the steering wheel, or if the last turn of the steering wheel recorded by the sensor 14 is so recent that it can be assumed that his hands are on the steering wheel, then an assessment is made next at S12 of whether CAB>TC>CAS, i.e. whether, on the one hand, the TC is too short for a collision to be avoided by braking, but on the other it is still long enough for a swerve maneuver according to route 15', and how far sideways the ego-vehicle 2 would have to swerve in order to pass the third-party vehicle 3.

If the required lateral displacement (d) of the ego-vehicle 2 is relatively small, in particular if it is smaller than the width of the lane 1', this justifies the assumption that the driver has already recognized the possibility of overtaking the third-party vehicle 3 and has accordingly positioned the ego-vehicle 2 in lane 1'. In this case a signal that a swerve maneuver is necessary is given (S13, S14).

That signal may include issuing a warning on the display instrument 16 (S13). In any event the signal should be issued in that the actuator 7 exerts a torque on the steering spindle 9, in the form of one or more short pulses, in the direction of lane 1', which is strong enough to be perceived by the driver's hands at the steering wheel 10, but at the same time not strong enough to outweigh the inertia of the steering system and the driver's arms and to actually noticeably turn the steering spindle 9 (S14). Such a torque pulse should last less than a second, typically 300 ms; the torque may be a few Nm, e.g. 3 Nm.

If the driver follows the prompt from the processing unit 5 to make a swerve maneuver quickly and decisively enough, a processor intervention by the processing unit 5 may be unnecessary. If, in order to drive the swerve route recommended by the processing unit 5, it is necessary to make sharper directional and speed interventions than those made by the driver, the processing unit 5 may, at S15 via the actuators 6, 7, perform a supporting or processor intervention in the control of the vehicle. A resistance by the driver against this processor intervention is unlikely, since it is aimed in the same direction of the driver's control intervention.

If it is established at S16 that the collision hazard has been eliminated, the processor intervention by the processing unit 5 finishes and the driver regains full control of the vehicle 2.

If however, it is shown at S12 that the lateral displacement necessary to drive around the hazard is greater than the width of a lane, or that the TC does not fall in the interval [CAS, CAB] and that a swerve maneuver is therefore of no use, it must be concluded that the driver is not prepared to change lanes and, if the processing unit 5 should attempt to perform a change of lane, would resist that since he would be afraid of colliding with other vehicles. The processing unit 5 takes this into account in that at S17, even if a swerve maneuver according to route 15' is physically possible, it plans a slowing down according to route 15, uses the display unit 16 to notify the driver of the need to brake, and additionally suggests slowing down at S18 by activating the actuator 7 in order to produce vibrations of the brake pedal 8 which the driver can feel if he has his foot on it.

If the driver indicates his agreement with the suggestion of the processing unit 5 by depressing the brake pedal 8, the processing unit 5, at S19, checks whether TC>CAB, i.e. is still long enough to slow the ego-vehicle 2 down to the speed of the vehicle 3 before colliding with it. If 'yes', it increases the braking deceleration at S20, if necessary, with the help of the actuator 6, to the level necessary to avoid the collision. If 'no', i.e. if TC<CAS, that is there is no longer enough time to drive around the hazard, but also if there is enough time available but the driver probably would not support the necessary swerve maneuver, a full emergency stop is initiated at S21, regardless of how strongly the driver is operating the brake pedal 8.

If the check at S11 shows that the driver is not prepared to perform a short term control intervention in the steering, then the processing unit 5 can do this without having to anticipate opposing actions by the driver. In that case, at S22, it will be initially checked whether a slowing down of the ego-vehicle 2 is still sufficient to avoid a collision, and if 'yes', then as described above in relation to steps S17, S18, S20, the necessity to brake will be notified at S23, S24, S25 by the display instrument 16 and the actuator 6, and finally, independently from that, whether or not the driver himself operates the brake pedal 8, the vehicle 2 will be slowed down sufficiently to avoid the collision.

If braking is not sufficient to avoid a collision, the process branches off at S26 to sequence S13 thru S16 already described above. The processing unit 5 may in the course direct a swerve maneuver where the lateral displacement is greater than the maximum allowed at S12. Even if the driver, as anticipated, was not prepared for such a large swerve maneuver, it can be made in this case since the driver cannot stop it if his hands are not on the steering wheel.

If the collision is no longer avoidable, the process branches from S26 into S9, S10 as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for assistance to a driver of an ego-vehicle to avoid a vehicle collision, the ego-vehicle comprising an environmental sensor adapted to monitor the traffic environment around the ego-vehicle, a processor which receives data from the environmental sensor, and a control instrument configured to intervene in the directional or speed control of the ego-vehicle, the processor controlling the control instrument in response to information received from the environmental sensor; the method comprising:
   (1) monitoring the traffic environment around the ego-vehicle with the environmental sensor;

(2) determining if the ego-vehicle is in danger of colliding with an object in front of the ego-vehicle by calculating a time to collision (TC) of the ego-vehicle with the object;
(3) determining if the ego-vehicle is in a manual driving mode or an automated driving mode;
  (a) if the vehicle is in an automated driving mode, then planning a control intervention of a control instrument of the ego-vehicle based on the predicted time to collision (TC), said control intervention comprising:
    (i) determining if application of brakes of the vehicle at a first level of braking is sufficient to avoid collision with the object; and if so, controlling brakes to apply the brakes at the first level of braking to slow the ego-vehicle; and
    (ii) if braking at said first level of braking is not sufficient to avoid collision with the object, then determining if it is feasible to steer the ego-vehicle to swerve around the object; whereby, if it is feasible to steer around the object, the processor controls the control instrument to swerve around the object, and, if it is not feasible to steer around the object, the processor controls the brakes at a second level of braking greater than the first level of braking; and
  (b) if the vehicle is in a manual driving mode, then determining if the driver's hands are on the steering wheel or are likely on the steering wheel such that the driver is likely to execute a driver intervention; and if it is determined that the driver is not likely to execute a driver intervention, then planning a control intervention of a control instrument of the ego-vehicle based on predicted time to collision (TC), said control intervention comprising:
    (i) determining if application of brakes of the vehicle at a first level of braking is sufficient to avoid collision with the object; and if so, controlling brakes to slow the ego-vehicle and
    (ii) if braking at said first level of braking is not sufficient to avoid collision with the object, then determining if it is feasible to steer the ego-vehicle to swerve around the object; whereby, if it is feasible to steer around the object, the processor controls the control instrument to swerve around the object, and, if it is not feasible to steer around the object, the processor controls the brakes at a second level of braking greater than the first level of braking.

2. The method of claim 1 wherein, in manual driving mode, the method further includes the steps of:
  if it is determined the driver's hands are on the steering wheel or likely on the steering wheel, determining if the driver is executing an intervention; and
  determining if the driver intervention is sufficient to swerve around the assessed danger if the driver is executing an intervention, and providing supporting intervention in the same direction as the driver's intervention if the driver intervention may not avoid a collision; or,
  notifying the driver of the need to brake if it is determined the driver is not prepared to change lanes, and if a driver consent to braking is received, control braking of the ego-vehicle as necessary to avoid a collision or reduce a collision impact.

3. The method according to claim 1, wherein the step of planning the control intervention comprises predicting a vehicle steering intervention having a maximum swerve not greater than a width of the vehicle for the driver of the ego-vehicle in reaction to the danger.

4. The method according to claim 1, wherein the step of planning the control intervention comprises assessing a responsiveness of the driver and accounting for the responsiveness of the driver.

5. The method according to claim 4, wherein the step of accounting for the responsiveness of the driver comprises responding to movement of the control instrument.

6. The method according to claim 1, comprising a step of communicating the planned control intervention to the driver through a user interface.

7. The method according to claim 6, wherein the user interface comprises an interface between the driver and the control instrument.

8. The method according to claim 7, wherein the step of communicating the planned control intervention to the driver comprising signaling the driver to manipulate the control instrument without executing the planned control intervention.

9. The method according to claim 7, wherein the control instrument comprises a steering wheel, wherein the step of communicating the planned control intervention to the driver comprises exercising a torque on the steering wheel in direction of the planned control intervention.

10. The method according to claim 1, wherein the step of planning a control intervention further comprises predicting a vehicle braking intervention for the driver of the ego-vehicle in reaction to the danger.

11. The method according to claim 1, wherein the step of planning a control intervention further comprises predicting a vehicle steering intervention having a maximum swerve not greater than a width of the vehicle for the driver of the ego-vehicle in reaction to the danger.

12. The method according to claim 1, further comprising assessing the responsiveness of the driver with a sensor, wherein the step of planning the control intervention accounts for the responsiveness of the driver.

13. The method according to claim 1, further comprising communicating the control intervention to the driver through a user interface.

* * * * *